United States Patent
Xia et al.

(10) Patent No.: US 8,452,174 B2
(45) Date of Patent: May 28, 2013

(54) MEASURING DIFFERENTIAL GROUP DELAY IN AN OPTICAL FIBER

(75) Inventors: Tiejun J. Xia, Richardson, TX (US); Glenn A. Wellbrock, Wylie, TX (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 383 days.

(21) Appl. No.: 12/944,244

(22) Filed: Nov. 11, 2010

(65) Prior Publication Data
US 2012/0121250 A1 May 17, 2012

(51) Int. Cl.
H04B 10/08 (2006.01)
H04B 10/12 (2006.01)
H04B 10/18 (2006.01)

(52) U.S. Cl.
USPC .................................. 398/29; 398/16; 398/81

(58) Field of Classification Search
USPC ................................ 398/16, 29, 81
See application file for complete search history.

(56) References Cited

U.S. PATENT DOCUMENTS

| | | | |
|---|---|---|---|
| 2004/0131363 A1* | 7/2004 | Kisaka et al. | 398/152 |
| 2009/0109425 A1* | 4/2009 | Xia | 356/73.1 |

* cited by examiner

*Primary Examiner* — Leslie Pascal

(57) ABSTRACT

A system includes an optical transmitter configured to generate an optical signal that includes a scrambled polarization state; and output the optical signal via an optical fiber associated with a network path that is transporting network traffic. The system also includes an optical receiver configured to receive the optical signal; measure a polarization associated with the optical signal; determine, based on the polarization, a degree of polarization associated with the test signal; identify a differential group delay associated with the test signal based on the degree of polarization; output a notification that the optical fiber is available to carry high capacity traffic when the differential group delay is less than a threshold, where the high capacity traffic includes a data rate that his greater than another threshold; and output a notification that the optical fiber is not available to carry the high capacity traffic when the differential group delay is not less than the threshold.

23 Claims, 7 Drawing Sheets

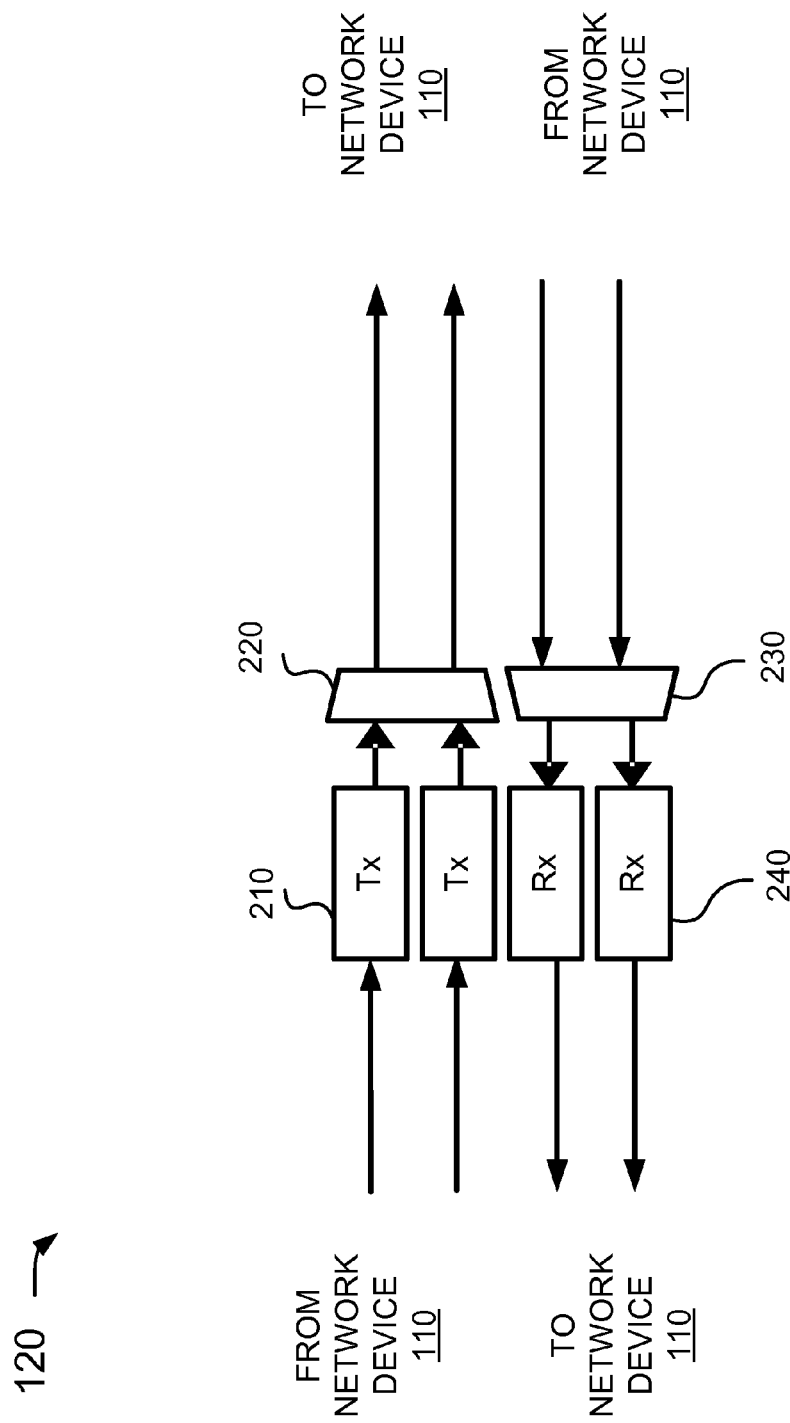

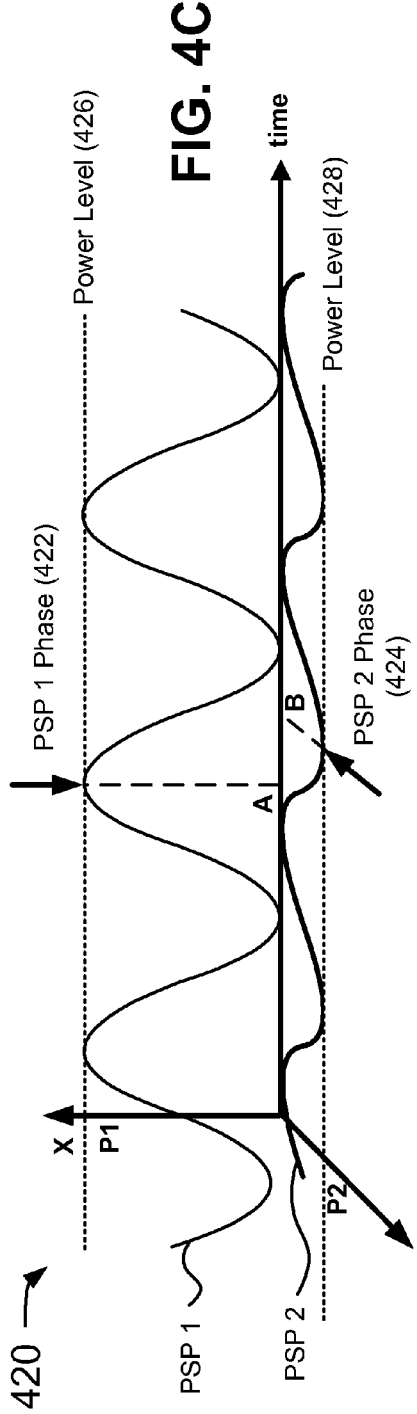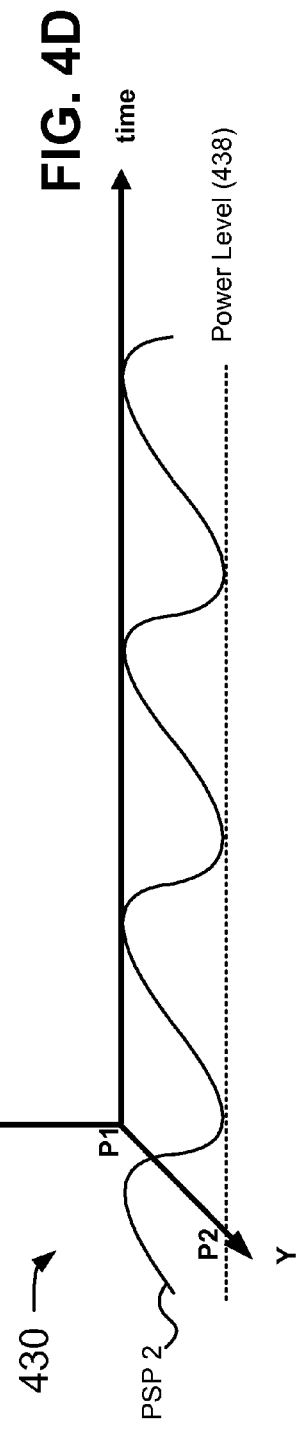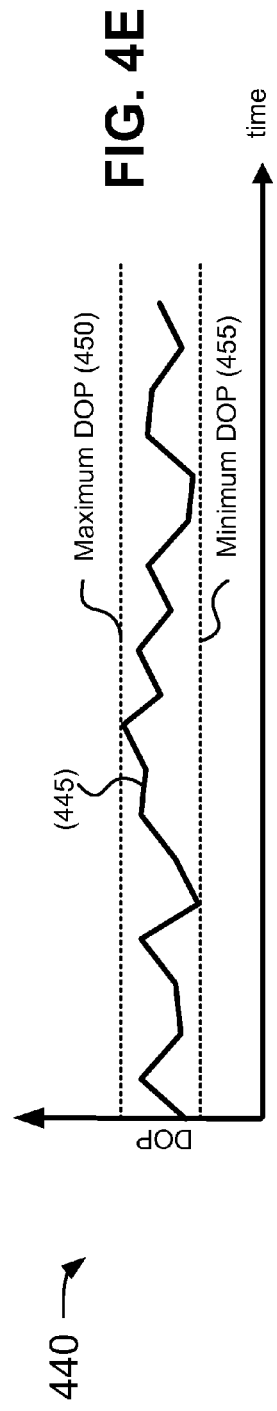

| Δ DOP 510 | DGD 520 |
|---|---|
| 0% | 0% |
| LOW | LOW |
| MEDIUM | MEDIUM |
| HIGH | HIGH |
| ... | ... |

MEASURING DIFFERENTIAL GROUP DELAY IN AN OPTICAL FIBER

BACKGROUND

Public and proprietary networks transmit traffic over network paths in order to provide services to network devices and/or user devices associated with the networks. Fiber optic cables include a group of fibers through which network traffic is transported as optical signals. Fiber optic cables enable traffic to be transported over longer distances, with less loss, and/or at higher bandwidths (or data rates) than other network paths (e.g., copper wires, etc.).

Unfortunately, some fibers, within fiber optic cables, include random imperfections that can cause the optical signal to become prematurely distorted (e.g., at a rate that exceeds a threshold) as the optical signal travels through the fiber optic cable. The imperfections may cause certain wavelengths, associated with the optical signal, to travel at different relative speeds (e.g., due to modal dispersion) and/or may cause different polarizations, associated with the optical signal, to travel at different speeds (e.g., due to polarization mode dispersion). Modal dispersion and/or polarization mode dispersion may cause pulses within the optical signal to spread (e.g., become distorted), which may reduce the bandwidth capacity, the maximum data rate, and/or a distance over which the traffic is able to flow within the fiber optic cable.

BRIEF DESCRIPTION OF THE DRAWINGS

FIG. 2 is a diagram of example components of a muxponder device of FIG. 1;

FIGS. 4A-4D are diagrams that illustrate example test signals associated with various degrees of polarization as measured by differential group delay receiver device of FIG. 1;

FIG. 4E is a diagram of an example degree of polarization measurement of a test signal;

FIG. 5 is a diagram of an example differential group delay data structure that is used when determining differential group delay associated with a test signal being transported over a working path of FIG. 1.

DETAILED DESCRIPTION OF PREFERRED EMBODIMENTS

The following detailed description refers to the accompanying drawings. The same reference numbers in different drawings may identify the same or similar elements. Also, the following detailed description does not limit the invention.

Systems and/or methods, described herein, may include a technique for determining a quantity of polarization mode dispersion associated with an optical fiber that is being used to transport traffic. The quantity of polarization mode dispersion associated with the optical fiber may enable a traffic capacity, associated with the optical fiber, to be determined while the fiber is transporting traffic (e.g., without transferring the traffic to another optical fiber). As described herein, an optical transmitter device may generate an optical test signal with a scrambled polarization state and may transmit the test signal over an optical fiber. An optical receiving device may receive the test signal and may measure a degree of polarization associated with the test signal. The optical receiver device may use information associated with the degree of polarization to determine a quantity of differential group delay associated with the test signal. The differential group delay may be used to approximate a quantity of polarization mode dispersion experienced by the test signal while traversing the optical fiber. Differential group delay may be determined based on whether a power shift and/or phase shift, associated with a polarization state of the test signal, is detected.

If the optical receiver device determines that the differential group delay, associated with the test signal, is less than a threshold, then the optical fiber may be used to carry a higher traffic load (e.g., associated with a bandwidth and/or data rate that is greater than a threshold). If, however, the optical receiver device determines that the differential group delay, associated with the test signal, is not less than the threshold, then the optical fiber may not be used to transport the higher traffic load.

Figure 1:
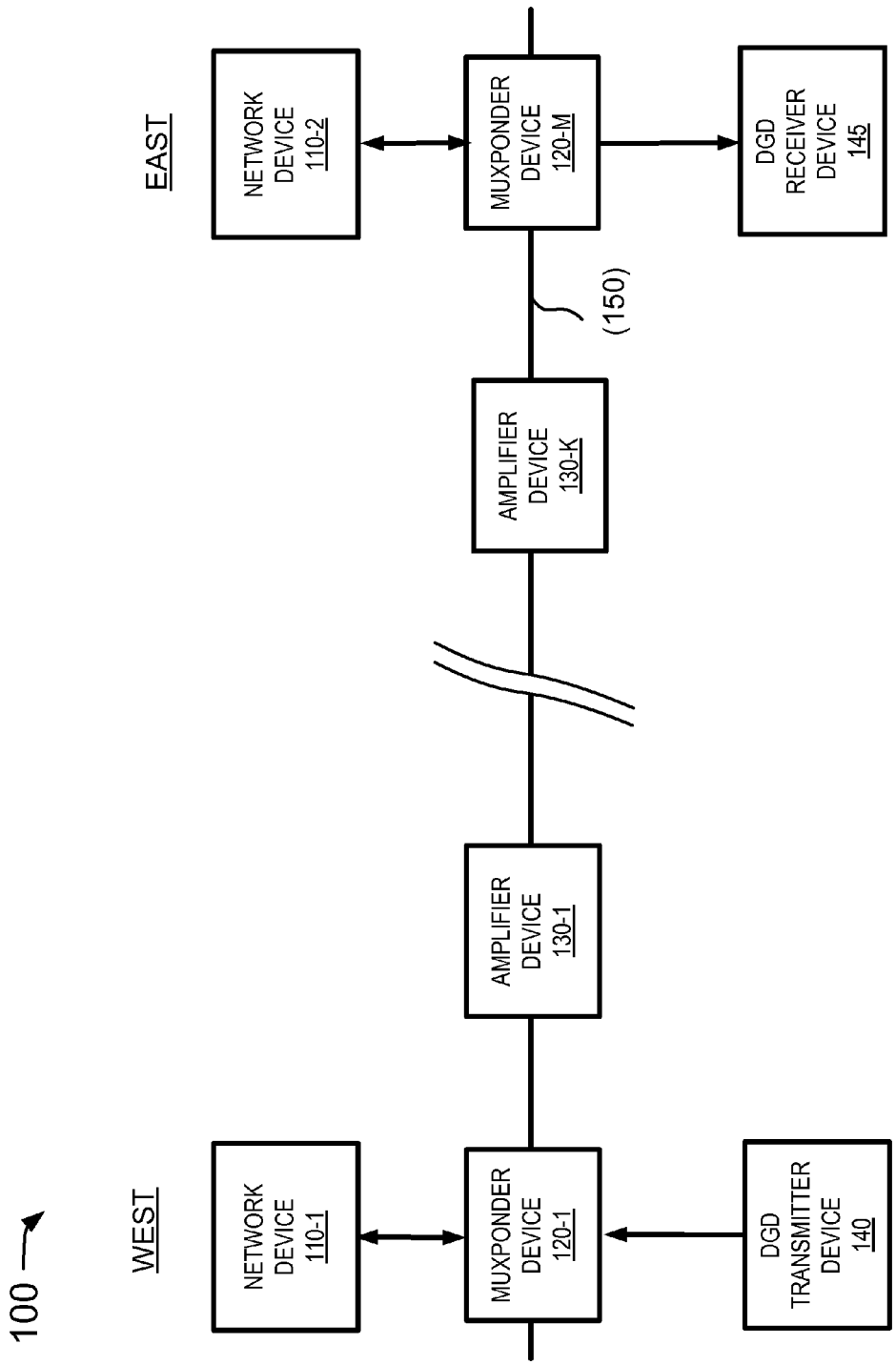
FIG. 1 is a block diagram of an example optical network in which systems and/or methods described herein may be implemented.

FIG. 1 is a block diagram of an example optical network 100 in which systems and/or methods described herein may be implemented. Optical network 100 may include a set of network devices 110-1 and 110-2 (referred to collectively as "network devices 110" and individually as "network device 110"), a set of muxponder devices 120-1 and 120-2 (referred to collectively as "muxponder devices 120" and individually as "muxponder device 120"), a group of amplifier devices 130-1, . . . , 130-K (where K≧1) (hereinafter referred to collectively as "amplifier devices 130" and individually as an "amplifier device 130"), a differential group delay (DGD) transmitter device 140, a differential group delay (DGD) receiver device 145, and a working path 150.

The number of devices and/or paths, illustrated in FIG. 1, is provided for explanatory purposes. In practice, there may be additional devices and/or paths, fewer devices and/or paths, different devices and/or paths, or differently arranged devices and/or paths than illustrated in FIG. 1. Also, in some implementations, one or more of the devices of optical network 100 may perform one or more functions described as being performed by another one or more of the devices of optical network 100. For example, functions attributable to amplifier device 130 could be performed by muxponder device 120-1, muxponder device 120-2, and/or by some other device. Additionally, functions, described as being performed by network device 110-1, may be performed by muxponder device 120-1, and/or functions, described as being performed by network device 110-2, may be performed by muxponder device 120-2.

Network device 110 may include one or more devices that switch, route, process, send, receive and/or provide information in a manner similar to that described herein. Network device 110 may communicate with muxponder device 120 to send and/or receive electrical signals containing information and/or data intended for operation and control of, and/or transmission over, optical network 100. Network device 110 may communicate with client networks and/or end user devices by processing and/or formatting signals, received from muxponder device 120, into protocols and/or standards that are understood and/or may be received by a client network and/or end user devices. Similarly, network device 110 may format and/or process signals received from client networks and/or end user devices for transmission to muxponder device 120 for transmission over optical network 100.

Muxponder device 120 may include one or more devices that receive, convert, process, switch, amplify, modulate, demodulate, multiplex, demultiplex, and/or transmit electrical and/or optical signals in a manner described herein. Muxponder device 120 may perform optical multiplexing operations by receiving a number of electrical signals and processing them into a single, multiplexed optical signal with multiple component wavelengths for transmission over an optical network. For example, muxponder device 120-1 may receive a number of electrical signals from network device 110-1 and may up-convert the received electrical signals into a number of modulated optical signals, each at a distinct optical wavelength. The modulated optical signals may be multiplexed into a single outgoing multi-wavelength optical signal (e.g., comprised of the component wavelengths of the individual optical signals), using wavelength division multiplexing techniques, for transmission over optical network 100, via working path 150 and/or some other network path.

Muxponder device 120 may also receive a multiplexed optical signal and may process the multiplexed optical signal into a number of modulated electrical signals for transmission over an electrical network. For example, muxponder device 120-2 may receive a multiplexed optical signal (e.g., containing many wavelengths) from amplifier device 130, via working path 150. Muxponder device 120-2 may demultiplex the received optical signal (e.g., using wavelength division demultiplexing techniques) into a number of optical signals, each at distinct wavelengths. The number of optical signals may be down-converted to a number of modulated electrical signals for transmission to network device 110-2.

Additionally, muxponder device 120 may perform optical amplification operations (e.g., amplify single and/or multi-wavelength optical signals), optical add-drop multiplexing operations (e.g., add and/or remove one or more signals from a multi-wavelength optical signal) and/or optical rerouting operations (e.g., reroute received optical signals to a protection path while maintenance is performed on a working path). To perform these operations, muxponder device 120 may contain various components, such as an optical multiplexer (to perform the optical multiplexing operations), an optical amplifier (to perform the optical amplification operations), an optical add-drop multiplexer (e.g., a remotely configurable add/drop multiplexer (ROADM) to perform the optical rerouting and/or optical add-drop multiplexing/demultiplexing operations), and/or an optical demultiplexer (to perform the optical demultiplexing operations).

Muxponder device 120-1 may permit test signals, received from DGD transmitter device 140, to be transmitted via an optical fiber associated with working path 150. In an example implementation, muxponder device 120-1 may be a ROADM device and may receive the test signal and may output the test signal to working path 150 via an add port associated with the ROADM device. Muxponder device 120-2 may enable test signals, received from working path 150, to be detected and/or outputted to DGD receiver device 145. In an example implementation, muxponder device 120-2 may be a destination ROADM device and may detect a test signal on working path 150. The destination ROADM device may receive the signal and may output the test signal to DGD receiver device 145 to be processed.

Amplifier device 130 may include a device capable of increasing the strength and/or amplitude of a received optical signal, while maintaining the wavelength and/or bandwidth characteristics, information content and/or integrity of the optical signal. In one implementation, one or more amplifier devices 130 may be spaced intermittently along working path 150 to increase the signal strength sufficiently to enable the optical signal to travel without disruption between muxponder device 120-1 and muxponder device 120-2.

DGD transmitter device 140 may include one or more devices that are capable of generating and/or transmitting an optical test signal, with a scrambled polarization state, via an optical fiber. In one example implementation, DGD transmitter device 140 may include an optical source (e.g., a laser) that generates an optical signal that may be modulated in order to create a test signal with particular characteristics associated with polarization, power level, frequency, bandwidth, and/or pulse information (e.g., duty cycle, period, etc.). For example, DGD transmitter 140 may generate the optical signal to include a polarization state that changes as a function of time. DGD transmitter device 140 may transmit the test signal over an optical fiber associated with working path 150 (e.g., via muxponder device 120-1).

DGD receiver device 145 may include one or more devices capable of receiving and/or processing an optical test signal (e.g., generated by DGD transmitter device 140) in order to determine a quantity of differential group delay associated with an optical fiber associated with working path 150. In one example, DGD receiver device 145 may determine a quantity of differential group delay associated with the test signal by measuring a degree of polarization associated with the test signal. DGD receiver device 145 may use the quantity of differential group delay to approximate the polarization mode dispersion associated with the optical fiber. In one example implementation, DGD receiver device 145 may measure a polarization state associated with the test signal over a period of time. When measuring the polarization state, DGD receiver device 145 may identify one or more principal states of polarization associated with the test signal. DGD receiver 145 may identify, from the measurement, a maximum degree of polarization and/or a minimum degree of polarization associated with the test signal in order to determine a quantity of change in the degree of polarization. Based on the quantity of change in the degree of polarization, DGD receiver device 145 may identify a quantity of differential group delay associated with the optical fiber.

Working path 150 may be a fiber optic cable or collection of fiber optic cables that interconnects muxponder device 120-1, muxponder device 120-2 and/or one or more amplifier devices 130. Working path 150 may permit network traffic (e.g., contained within optical signals) to travel between muxponder devices 120 and amplifier devices 130. In one implementation, as shown in FIG. 1, working path 150 may carry one-way traffic (e.g., from muxponder device 120-1 to muxponder device 120-2 via amplifier devices 130). In another implementation, working path 150 may carry two-way traffic that includes network traffic traveling from muxponder device 120-1 to muxponder device 120-2 (e.g., east bound) via amplifier devices 130 and network traffic traveling from muxponder device 120-2 to muxponder device 120-1 (e.g., west bound) via other amplifier devices 130 (e.g., not shown in FIG. 1).

FIG. 2 is a diagram of example components of muxponder device 120. As illustrated in FIG. 2, muxponder device 120 may include a bank of one or more transmitters (Tx) 210, one or more wavelength division multiplexers 220, one or more wavelength division demultiplexers 230 and/or a bank of one or more receivers (Rx) 240. The bank of transmitters (Tx) 210 may be connected to one or more wavelength division multiplexers 220, and one or more wavelength division demultiplexers 230 may be connected to the bank of one or more receivers (Rx) 240.

Although FIG. 2 shows example components of muxponder device 120, in other implementations, muxponder device 120 may contain fewer components, additional components, different components, or differently arranged components than depicted in FIG. 2. Furthermore, in some implementations, one or more of the components of muxponder device 120 may perform one or more functions described as being performed by another one or more of the components of muxponder device 120. For example, one or more functions attributable to transmitter 210 could be performed by wavelength division multiplexer 220. In another example, one or more functions attributable to receiver 240 could be performed by wavelength division demultiplexer 230.

Transmitter 210 may generally be regarded as an optical source, and may include any device that uses an electrical signal, such as an electrical signal received from network device 110 to modulate and generate an optical signal at a given wavelength. In one implementation, transmitter 210 may include a laser, which may generate and transmit an optical signal at a particular wavelength and/or with a particular bandwidth. For example, a bank of transmitters 210 may output multiple spatially-separated optical signals (e.g., at distinctly different wavelengths), to wavelength division multiplexer 220.

Wavelength division multiplexer 220 may include any device that merges and/or combines separate optical input signals at unambiguously distinguishable wavelengths into a single multi-wavelength optical output signal with a particular bandwidth. In one implementation, wavelength division multiplexer 220 may receive multiple spatially-separate optical signals from transmitters 210, and may merge the multiple optical signals to produce a multi-wavelength outgoing signal for transmission to amplifier device 130 over working path 150.

Wavelength division demultiplexer 230 may include any device that receives an incoming optical signal that contains multiple wavelengths, such as a wavelength division multiplexed optical signal received from amplifier device 130 (e.g., via working path 150) and spatially separates the component wavelengths of the received optical signal, such that there are a number of separate outgoing optical signals at each component wavelength. In one implementation, wavelength division demultiplexer 230 may receive a multi-wavelength optical signal from amplifier device 130 and may send a number of outgoing signals at component wavelengths to receivers 240.

Receiver 240 may include a device, such as a charged coupled device and/or photo detector that receives an incoming optical signal and uses the incoming optical signal to generate an outgoing modulated electrical signal. In one implementation, a bank of receivers 240, as shown in FIG. 2, may receive a number of incoming optical signals (e.g., from wavelength division demultiplexer 230) and may generate a number of corresponding modulated electrical signals (e.g., including video, text, data and/or telephonic signals) for transmission to network device 110.

Figure 3A:
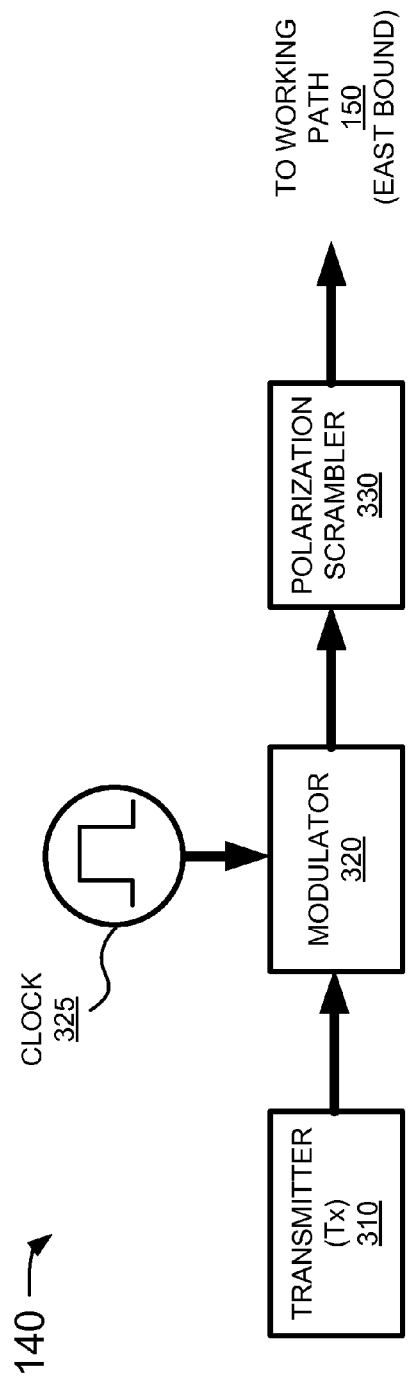
FIGS. 3A and 3B are diagram of example components of differential group delay devices of FIG. 1.

FIG. 3A is a diagram of example components of DGD transmitter device 140. As illustrated in FIG. 3A, DGD transmitter device 140 may include a collection of components, such as a transmitter (Tx) 310, a modulator 320, a clock 325, and a polarization scrambler 330. Although FIG. 3A shows example components of DGD transmitter device 140, in other implementations, DGD transmitter device 140 may contain fewer components, additional components, different components, or differently arranged components than depicted in FIG. 3A. Furthermore, in some implementations, one or more of the components of DGD transmitter device 140 may perform one or more functions described as being performed by another one or more of the components of DGD transmitter device 140.

Transmitter 310 may include one or more components that are capable of generating an optical signal that can be outputted to an optical fiber. In one implementation, transmitter 310 may generate and/or transmit an optical signal at a particular wavelength and/or with a particular bandwidth, which may be tuned and/or calibrated by a user of DGD transmitter device 140. Transmitter 310 may be tuned to enable the wavelength to be changed in a manner that permits the test signal to be sent over one or more channels within an optical fiber associated with working path 150.

Modulator 320 may include one or more components that are capable of modulating an optical signal received from transmitter 310. For example, modulator 320 may receive an optical signal from transmitter 310 and may modulate the signal using a clock signal received from clock 325. The clock signal may include a train of pulses, which modulator 320 may use to switch and/or modulate the optical signal to create a modulated signal. The modulated signal may include a train of pulses associated with a particular power level, bandwidth, duty cycle, period, etc. Modulator 320 may send the modulated signal to polarization scrambler 330.

Clock 325 may include one or more components that are capable of generating a clock signal. For example, clock 325 may include a crystal oscillator that generates a periodic signal that may be amplified, processed and/or outputted to one or more components in DGD transmitter device 140. Clock 325 may output a clock signal, such as a square wave, a sinusoidal wave and/or some other waveform, with a particular period and/or duty cycle.

Polarization scrambler 330 may include a component or set of components that are capable of scrambling a polarization state associated with a modulated signal. For example, polarization scrambler 330 may receive a modulated signal from modulator 320 and may cause a polarization state, associated with the modulated signal, to continuously change as a function of time. The continuous change in the polarization state (e.g., associated with a polarization vector and/or principle state of polarization (PSP)) may be associated with a periodic, a random, and/or some other change in polarization state. Polarization scrambler 330 may output the modulated signal with the scrambled polarization state, as an optical test signal, to muxponder device 120-1 to be transported over a fiber within working path 150.

Figure 3B:
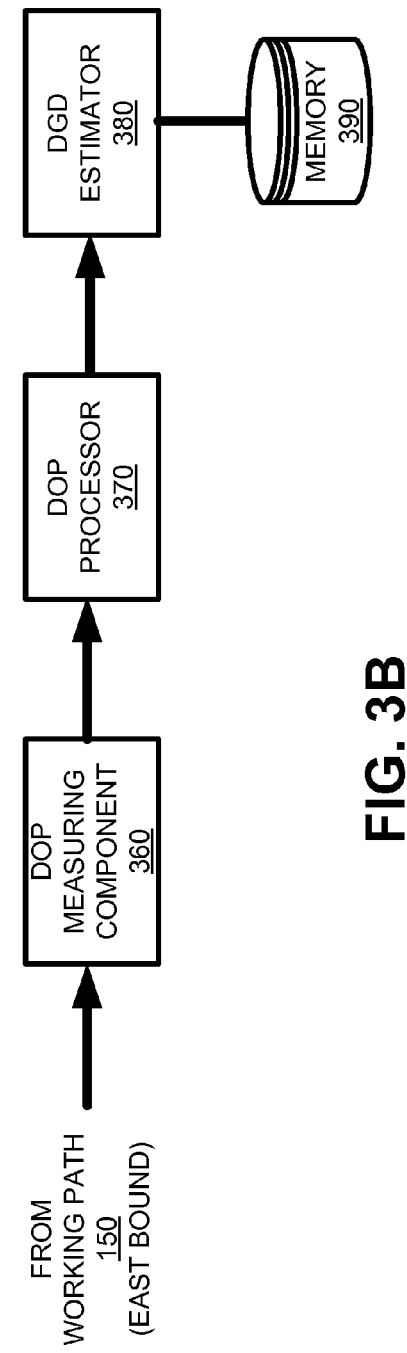

FIG. 3B is a diagram of example components of DGD receiver device 145. As illustrated in FIG. 3B, DGD receiver device 145 may include a collection of components, such as a degree of polarization (DOP) measuring component 360, a degree of polarization (DOP) processor 370, a differential group delay (DGD) estimator 380, and a memory 390. Although FIG. 3B shows example components of DGD receiver device 145, in other implementations, DGD receiver device 145 may contain fewer components, additional components, different components, or differently arranged components than depicted in FIG. 3B. Furthermore, in some implementations, one or more of the components of DGD receiver device 145 may perform one or more functions described as being performed by another one or more of the components of DGD receiver device 145.

DOP measuring component 360 may include a component or set of components that measure a polarization state associated with a test signal. For example, DOP measuring component 360 may receive a test signal, from working path 150 and may measure one or more PSP associated with the test signal as a function of time. When measuring the PSP, DOP measuring component 360 may identify a frequency, bandwidth, amplitude (e.g., associated with a power level), phase, and/or other information associated with the test signal. DOP measuring component 360 may, for example, measure a PSP component associated with the test signal at a particular point in time and may repeatedly and/or continuously perform the measurement during a particular period of time.

Alternatively, or additionally, DOP measuring component 360 and may, based on the measurement, determine whether the measured PSP is associated with another PSP component that is orthogonal to the PSP component. In one example, if the other PSP component has approximately the same amplitude and phase as the PSP component, then DOP measuring component 360 may not detect any degree of polarization associated with the test signal. In another example, if the other PSP component has a different phase (e.g., has experienced a relative phase shift), but approximately the same amplitude (e.g., an equal relative power shift) than the PSP component, then DOP measuring component 360 may detect a minimum quantity of degree of polarization (e.g., less than a lower degree of polarization threshold) associated with the test signal. In yet another example, if the other PSP component has a different phase and a different amplitude (e.g., has experienced an unequal relative power shift) than the PSP component, then DOP measuring component 360 may detect an intermediate quantity of degree of polarization (e.g., not less than the lower degree of polarization threshold and less than a higher degree of polarization threshold) associated with the test signal. In still another example, if the other PSP component has a different phase and a different amplitude (e.g., where the amplitude of the PSP component is less than a threshold) than the PSP component, then DOP measuring component 360 may detect a high quantity of degree of polarization (e.g., not less than the higher degree of polarization threshold) associated with the test signal. In this example, if no amplitude, associated with the PSP component, is detected, then the quantity of degree of polarization may be at a maximum level.

DOP processor 370 may include a component or set of components that processes degree of polarization measurements associated with the test signal. For example, DOP processor 370 may receive information associated with degree of polarization measurements, received from DOP measuring component 360, as a function of time. DOP processor 370 may monitor the information associated with degree of polarization measurements over a period of time and may identify a maximum quantity of degree of polarization (e.g., $DOP_{MAX}$) and/or a minimum quantity of degree of polarization (e.g., $DOP_{MIN}$) within the period of time. DOP processor 370 may determine a change in degree of polarization associated with the test signal based on the maximum quantity of degree of polarization and/or the minimum quantity of degree of polarization (e.g., $\Delta DOP \cong (DOP_{MAX} - DOP_{MIN})/DOP_{MAX}$, where $\Delta DOP$ is a normalized change in degree of polarization). DOP processor 370 may send information associated with a change in degree of polarization to DGD estimator 380.

DGD estimator 380 may include a component or set of components that determine a quantity of differential group delay associated with the test signal. For example, DGD estimator 380 may receive information associated with a change in degree of polarization (e.g., associated with the test signal) from DOP processor 370 and may use the information associated with the change in degree of polarization to identify a quantity of differential group delay associated with the test signal. DGD estimator 380 may, for example, perform a lookup operation by communicating with memory 390, within which a differential group delay data structure is stored. The differential group delay data structure may include information associated with changes in degree of polarization and information associated with a quantity of differential group delay that is associated with the information associated with the changes in degree of polarization. DGD estimator 380 may identify the quantity of differential group delay associated with the test signal that corresponds to the change in degree of polarization based on the look up operation.

Memory 390 may include a component or set of components that store the differential group delay data structure. Memory 390 may communicate with DGD estimator 380 to retrieve information associated with a quantity of differential group delay (e.g., that corresponds to a change in degree of polarization) in response to an instruction received from DGD estimator 380 when performing the look up operation.

Figure 4A:
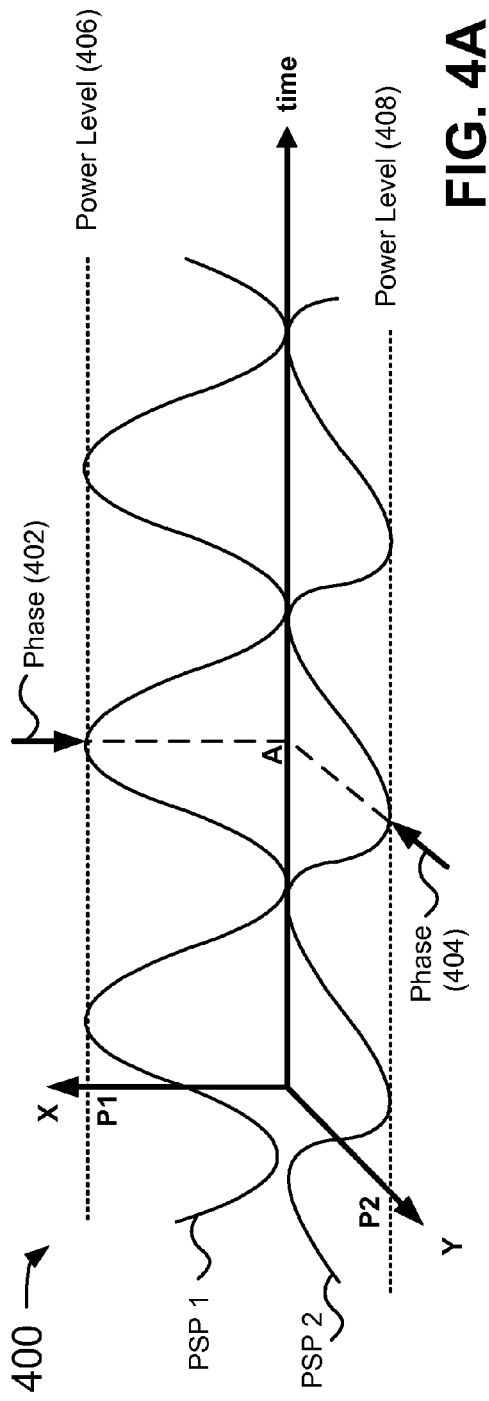

FIGS. 4A-4D are diagrams that illustrate example test signals 400-430 associated with various degrees of polarization as measured by DGD receiver device 145. For example, DGD receiver device 145 may receive a test signal from DGD transmitter device 140 via working path 150 and DOP measuring component 360 may measure the test signal to obtain information associated with a degree of polarization associated with the test signal to determine whether the test signal has experienced differential group delay while traversing working path 150. As illustrated in FIG. 4A, DOP measuring component 360 may measure a PSP component (e.g., PSP 1) and/or another PSP component (e.g., PSP 2), associated with test signal 400. The other PSP component may be at a different polarization (e.g., shown in the YT plane) than the PSP component (e.g., shown in the XT plane). In one example, the other PSP component may be orthogonal to the PSP component.

DOP measuring component 360 may measure a phase 402 associated with the PSP component and a phase 404 associated with the other PSP component. When the phase associated the PSP component is approximately equal to the phase associated with the other PSP component (e.g., when a point on PSP 1 and a corresponding point on PSP 2 correspond to approximately a same point in time "A"), DOP measuring component 360 may determine that there has been no phase shift between the PSP component and the other PSP component. Alternatively, or additionally, DOP measuring component 360 may measure a power level 406 associated with the PSP component and a power level 408 associated with the other PSP component. When the power level associated the PSP component is approximately equal to the power level associated with the other PSP component (e.g., when amplitude P1 is approximately equal to amplitude P2), DOP measuring component 360 may determine that there has been no relative power shift between the PSP component and the other PSP component. Based on a determination that there has been no phase shift and/or no power shift associated with test signal 400, the DOP measuring component 360 may determine that a quantity of degree of polarization is approximately equal to zero percent.

Figure 4B:
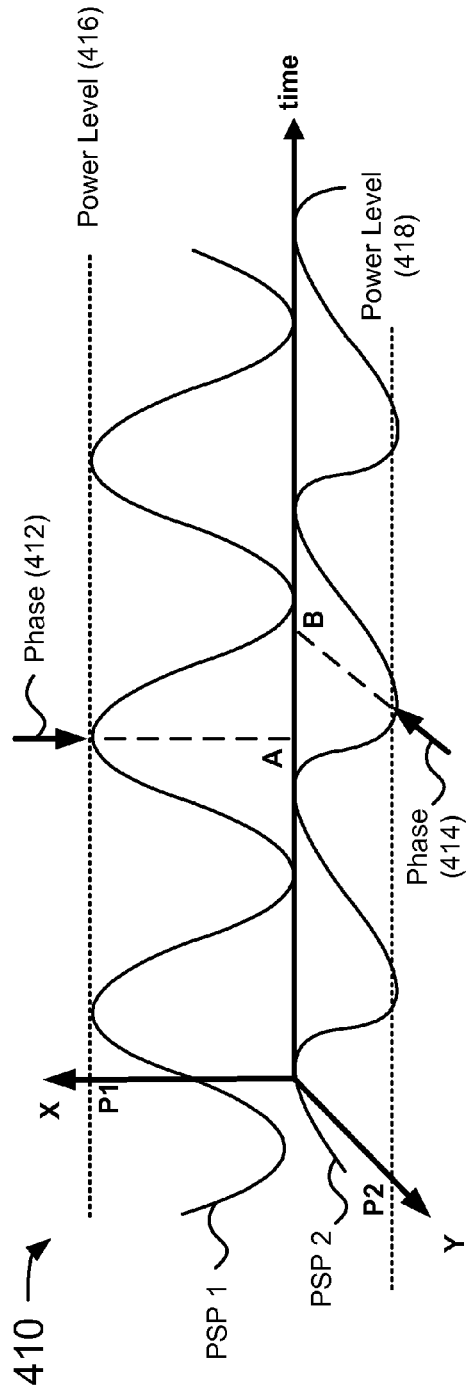

As illustrated in FIG. 4B, DOP measuring component 360 may measure a PSP component (e.g., PSP 1) and/or another PSP component (e.g., PSP 2) associated with test signal 410. DOP measuring component 360 may determine that a phase shift has occurred when a phase (e.g., phase 412) associated the PSP component is not equal to a phase (e.g., phase 414) associated with the other PSP component (e.g., when a point on PSP 1 and a corresponding point on PSP 2 correspond to different points in time "A" and "B," respectively). Alternatively, or additionally, DOP measuring component 360 may determine that a relative power shift has not occurred when a power level (e.g., power level 416) associated the PSP component is approximately equal to a power level (e.g., power level 418) associated with the other PSP component (e.g., when amplitude P1 is approximately equal to amplitude P2). Based on a determination that a phase shift has occurred and/or that a relative power shift has not occurred, DOP measuring component 360 may determine that test signal 410 has experienced a low quantity of degree of polarization (e.g., less than a minimum degree of polarization threshold) while traversing working path 150.

As illustrated in FIG. 4C, DOP measuring component 360 may measure a PSP component (e.g., PSP 1) and/or another PSP component (e.g., PSP 2) associated with test signal 420. DOP measuring component 360 may determine that a phase shift has occurred when a phase (e.g., phase 422) associated the PSP component is not equal to a phase (e.g., phase 424) associated with the other PSP component (e.g., when a point on PSP 1 and a corresponding point on PSP 2 correspond to different points in time "A" and "B," respectively). Alternatively, or additionally, DOP measuring component 360 may determine that a relative power shift has occurred when a power level (e.g., power level 426), associated with the PSP component, is different than a power level (e.g., power level 428) associated with the other PSP component (e.g., when amplitude P1 is not equal to amplitude P2). Based on a determination that a phase shift has occurred and/or that a relative power shift has occurred, DOP measuring component 360 may determine that test signal 420 has experienced an intermediate quantity of degree of polarization (e.g., not less than the minimum degree of polarization threshold and less than a maximum degree of polarization threshold) while traversing working path 150.

As illustrated in FIG. 4D, DOP measuring component 360 may not detect a PSP component (e.g., PSP 1) and/or may measure another PSP component (e.g., PSP 2) associated with test signal 430. DOP measuring component 360 may determine that there is no power level associated with the PSP component and/or may measure a power level (e.g., power level 438) associated with the other PSP component (e.g., when amplitude P1 is less than a minimum power threshold and when amplitude P2 is not less than the minimum power threshold). Based on a determination that a maximum relative power shift has occurred (e.g., where the power associated with test signal 430 is transported via the other PSP component), DOP measuring component 360 may determine that test signal 430 has experienced a maximum quantity of degree of polarization (e.g., greater than the maximum degree of polarization threshold) while traversing working path 150.

FIG. 4E is a diagram of an example degree of polarization measurement 440 (hereinafter referred to as "DOP measurement 440") of a test signal. As illustrated in FIG. 4E, DOP measurement 440 may include a degree of polarization (DOP) curve 445, a maximum degree of polarization (DOP) 450, and a minimum degree of polarization (DOP) 455.

DOP curve 445 may include a degree of polarization, associated with a test signal, as a function of time. For example, DGD receiver device 145 may receive the test signal form working path 150 and may measure a quantity of degree of polarization in a continuous manner and/or at discrete intervals over a period of time. DGD receiver 145 may measure an instantaneous degree of polarization at a particular point in time within the period of time. DGD receiver 145 may repeat the measurement throughout the period of time to obtain a collection of instantaneous degree of polarization values to be included in DOP curve 445.

Maximum DOP 450 may be a quantity of degree of polarization that corresponds to a maximum quantity of degree of polarization within the period of time that the measurement was performed. Minimum DOP 455 may be a quantity of degree of polarization that corresponds to a minimum quantity of degree of polarization within the period of time that the measurement was performed.

For example, DGD receiver device 145 may perform the measurement on the test signal and may store information associated with DOP curve 445 associated with the time period during which the measurement is performed. DGD receiver device 145 may identify a point, associated with the information associated with DOP curve 445, that corresponds to a maximum quantity of degree of polarization within the time period. Based on the identification of the point that corresponds to the maximum quantity of degree of polarization, DGD receiver device 145 may set a value associated with maximum DOP 450. Alternatively, or additionally, DGD receiver device 145 may identify another point, associated with the information associated with DOP curve 445, that corresponds to a minimum quantity of degree of polarization within the time period. Based on the identification of the other point that corresponds to the minimum quantity of degree of polarization, DGD receiver device 145 may set another value associated with minimum DOP 455. DGD receiver 145 may use the value associated with maximum DOP 450 and/or the other value associated with minimum DOP 455 to determine a change in degree of polarization (e.g., $\Delta$DOP) in a manner similar to that described above (e.g., with respect to FIG. 3).

Figure 5:
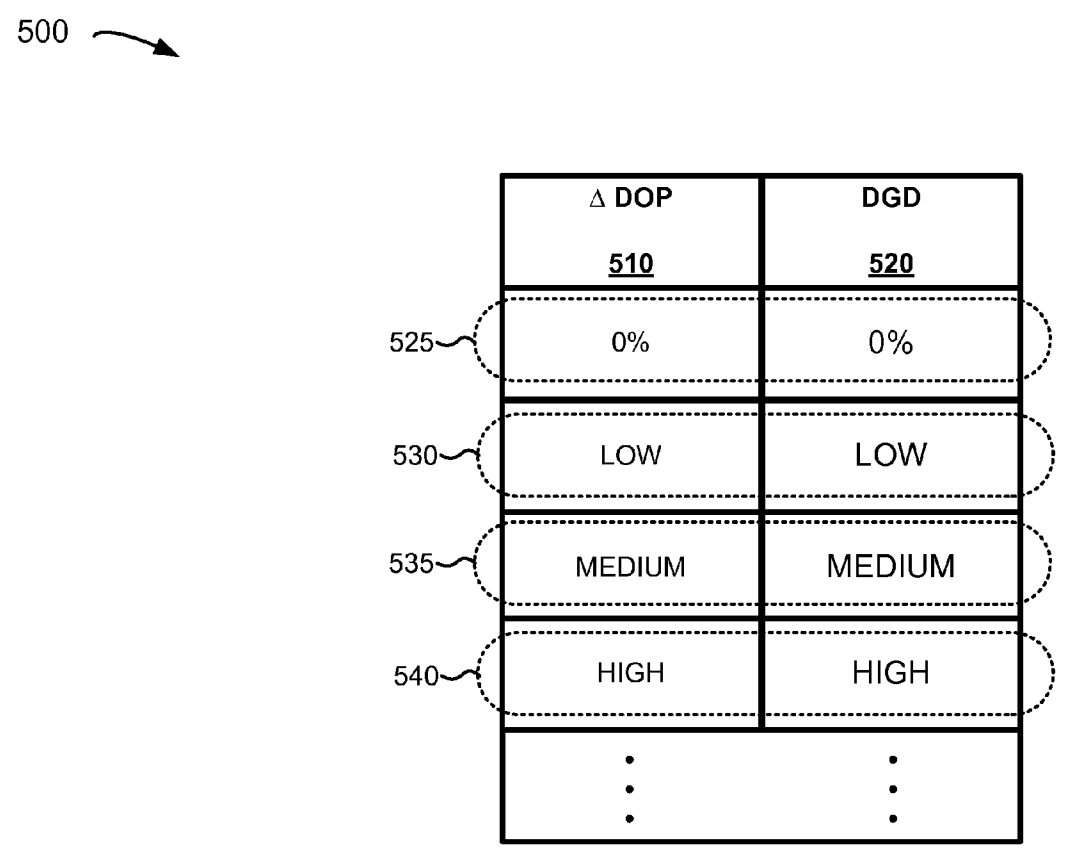

FIG. 5 is a diagram of an example differential group delay data structure 500 (hereinafter referred to as "DGD data structure 500") that is used when determining differential group delay associated with a test signal being transported over working path 150. DGD data structure 500 may be stored in a memory (e.g., memory 390 or some other memory) associated with DGD receiver device 145. As illustrated in FIG. 5, DGD data structure 500 may include a change in degree of polarization (e.g., $\Delta$DOP) field 510 (hereinafter referred to as "DOP field 510") and a differential group delay (DGD) field 520.

Although FIG. 5 shows example fields of DGD data structure 500, in other implementations, DGD structure 500 may contain fewer fields, different fields, additional fields, or differently arranged fields than depicted in FIG. 5. Additionally, or alternatively, one or more fields of DGD data structure 500 may include information described as being included in one or more other fields of DGD data structure 500.

DOP field 510 may store a value associated with a change in a degree of polarization associated with a particular test signal. DGD field 520 may store a value associated with a quantity of differential group delay that corresponds to the change in degree of polarization associated with the particular test signal. For example, DOP field 510 may store a value associated with a minimum value (e.g., approximately 0%) associated with a change in degree of polarization (e.g., test signal 400 of FIG. 4A) that corresponds to a minimum quantity (e.g., approximately 0%) of differential group delay (e.g., as shown by ellipse 525). In another example, DOP field 510 may store a value (e.g., shown as "low") associated with a quantity of change in degree of polarization that is less than a degree of polarization threshold (e.g., test signal 410 of FIG. 4B) that corresponds to a low quantity (e.g., less than a DGD threshold) of differential group delay (e.g., as shown by ellipse 530).

In yet another example, DOP field 510 may store a value (e.g., shown as "medium") associated with a quantity of change in degree of polarization that is not less than the degree of polarization threshold and less than a high degree of polarization threshold (e.g., test signal 420 of FIG. 4C) that corresponds to a medium quantity (e.g., not less than the differential group delay threshold and less than a high differential group delay threshold) of differential group delay (e.g., as shown by ellipse 535). In still another example, DOP field 510 may store a value (e.g., shown as "high") associated with a quantity of change in degree of polarization that is not less than the high degree of polarization threshold (e.g., test signal 430 of FIG. 4D) that corresponds to a high quantity (e.g., not less than the high differential group delay threshold) of differential group delay (e.g., as shown by ellipse 540). DGD data structure 500 may store other values associated with a quantity of change in degree of polarization and other quantities of differential group delay that correspond to the other values associated with the quantity of change in degree of polarization.

Figure 6:
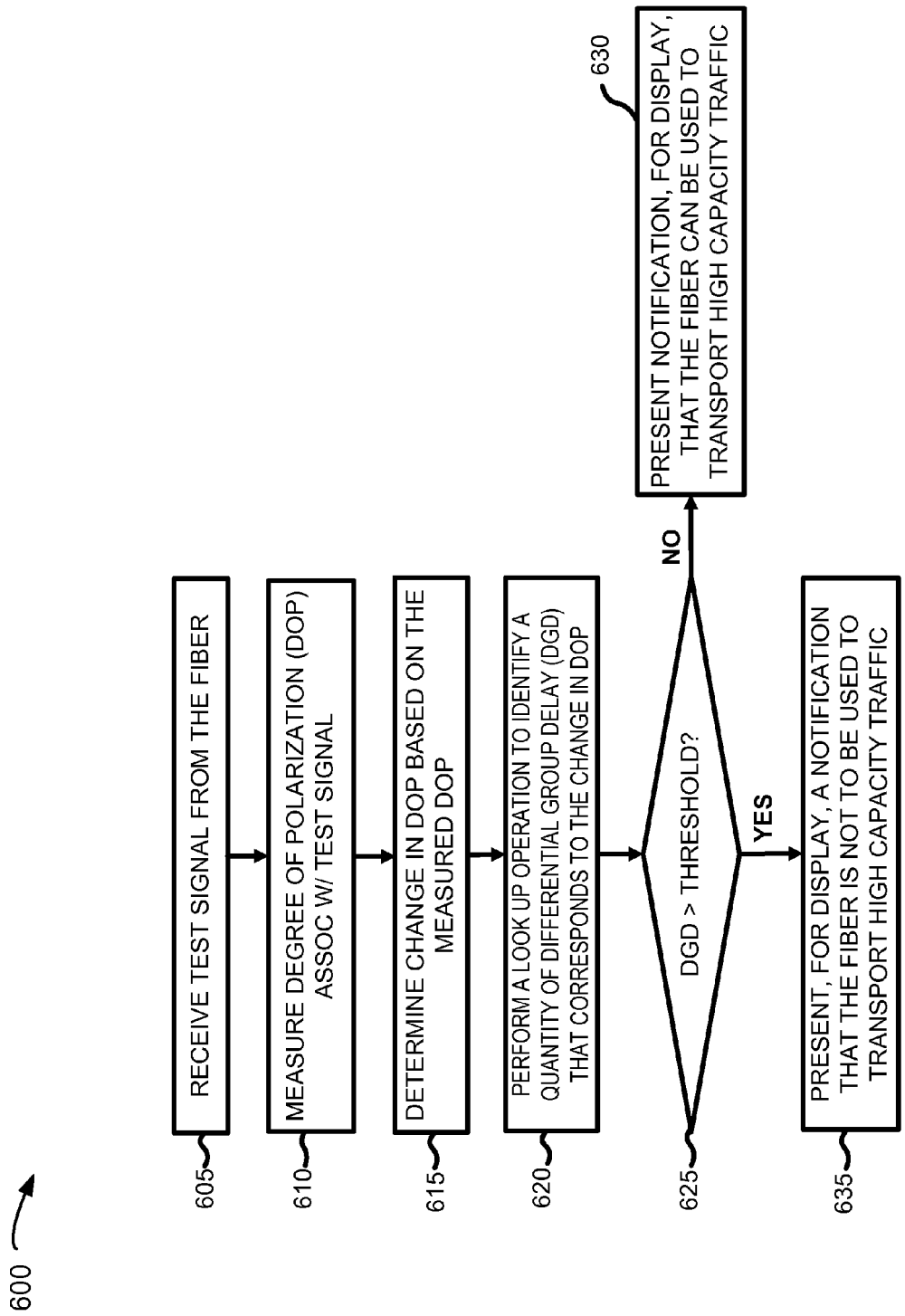
FIG. 6 is a flowchart of an example process for determining differential group delay associated with a test signal.

FIG. 6 is a flowchart of an example process 600 for determining differential group delay associated with a test signal. In one implementation, some or all of process 600 may be performed by DGD receiver device 145. In another implementation, some or all of process 600 may be performed by one or more devices separate from, or in combination with, DGD receiver device 145.

As shown in FIG. 6, process 600 may include receiving a test signal from an optical fiber (block 605) and measuring a degree of polarization associated with the test signal (block 610). Assume that DGD transmitter device 140 interconnected to muxponder device 120-1 (e.g., such as a ROADM device) via an add port that enables an optical test signal to be transmitted via an optical fiber, associated with working path 150, that is carrying network traffic. Assume further that the test signal is transmitted by DGD transmitter device 140 in a manner that includes a scrambled polarization state. Assume still further that DGD receiver device 145 is interconnected to muxponder device 120-2 (e.g., such as another ROADM device) via a drop port that enables the test signal to be received from working path 150.

For example, DGD receiver device 145 may receive a test signal from working path 150. The test signal may be received via a particular channel (e.g., associated with a particular wavelength) within working path 150 (e.g., that carries network traffic via other channels within the optical fiber). DGD receiver device 145 may measure a degree of polarization associated with the test signal over a period of time. The measurement may include determining, in a manner similar to that described above (e.g., with respect to FIGS. 4A-4D), whether a PSP component and/or another PSP component can be detected. The measurement may also include determining whether a relative phase shift and/or power shift is associated with the PSP component and/or the other PSP component.

As also shown in FIG. 6, process 600 may include determining a change in degree of polarization based on the measured degree of polarization (block 615). For example, based on the measurement, DGD receiver device 145 may identify a maximum value associated with the measured degree of polarization within a period of time and/or a minimum value associated with the measured degree of polarization within the period of time. DGD receiver device 145 may, for example, determine a change in the degree of polarization, associated with the test signal, based on a difference between the maximum value (e.g., $DOP_{MAX}$) and the minimum value (e.g., $DOP_{MIN}$). In one example, DGD receiver device 145 may generate a normalized change in degree of polarization (e.g., $\Delta DOP \cong (DOP_{MAX} - DOP_{MAX})/DOP_{MAX}$, where $\Delta DOP$ is the normalized change in degree of polarization).

As further shown in FIG. 6, process 600 may include performing a look-up operation to identify a quantity of differential group delay that corresponds to the change in degree of polarization (block 620). For example, based on the change in degree of polarization, DGD receiver device 145 may perform a look-up operation to determine a quantity of differential group delay associated with the test signal. When performing the look-up operation, DGD receiver device 145 may determine that the change in degree of polarization matches another change in degree of polarization, from a list of values associated with changes in degree of polarization, stored in a data structure (e.g., DGD data structure 500 of FIG. 5) within a memory associated with DGD receiver device 145. Based on the determination that the change in degree of polarization matches the other change in degree of polarization stored in the data structure, DGD receiver device 145 may obtain, from the data structure, a value associated with a quantity of differential group delay that corresponds to the other change in degree of polarization.

As yet further shown in FIG. 6, if a quantity of differential group delay is not greater than a threshold (block 625-NO), then process 600 may include presenting a notification, for display, that the fiber can be used to transport high capacity traffic (block 630). For example, DGD receiver device 145 may compare the value associated with the quantity of differential group delay to a threshold. DGD receiver device 145 may, for example, determine that the value associated with the differential group delay is not greater than the threshold. Based on the determination that the value associated with the differential group delay is not greater than the threshold, DGD receiver device 145 may present, for display (e.g., on a display device associated with DGD receiver device 145), a notification that indicates that the fiber, associated with working path 150, may be used to transport high capacity traffic (e.g., traffic associated with a bandwidth and/or data rate that is greater than a capacity threshold).

In another example implementation, DGD receiver 145 may receive another test signal from another channel (e.g., associated with another wavelength) within the optical fiber. DGD receiver 145 may process the other test signal, in a manner similar to that described above (e.g., with respect to blocks 610-620), by measuring a degree of polarization associated with the other test signal, determining another change in the degree of polarization (e.g., based on a maximum and minimum degree of polarization), and/or performing another look-up operation based on the other change in the degree of polarization.

Based on the other look-up operation, DGD receiver device 145 may identify another value associated with a quantity of differential group delay associated with the other test signal. DGD receiver device 145 may determine an average value associated with the quantity of differential group delay based on the value associated with the quantity of differential group delay (e.g., associated with the test signal) and the other value associated with the quantity of differential group delay (e.g., associated with the other test signal). DGD receiver device 145 may, for example, determine that the average value associated with the differential group delay is not greater than the threshold. Based on the determination that the average value associated with the differential group delay is not greater than the threshold, DGD receiver device 145 may present, for display (e.g., on a display device associated with DGD receiver device 145), a notification that indicates that the fiber, associated with working path 150, may be used to transport high capacity traffic. DGD receiver device 145 may generate another average value, associated with a quantity of differential group delay, for a quantity of channels specified by a network administrator associated with optical network 100. Additionally, or alternatively, DGD receiver device 145 may process test signals, in a manner similar to that described above (e.g., with respect to blocks 605-630), for other optical fibers within a fiber optic cable associated with working path 150.

As yet further shown in FIG. 6, if a quantity of differential group delay is greater than a threshold (block 625-YES), then process 600 may include presenting, for display, a notification that the fiber is not to be used to transport high capacity traffic (block 635). For example, DGD receiver device 145 may compare the value associated with the quantity of differential group delay to a threshold. DGD receiver device 145 may, for example, determine that the value associated with the differential group delay is greater than the threshold. Based on the determination that the value associated with the differential group delay is greater than the threshold, DGD receiver device 145 may present, for display (e.g., on a display device associated with DGD receiver device 145), a notification that indicates that the fiber, associated with working path 150, is not to be used to transport high capacity traffic.

In another example implementation, DGD receiver 145 may receive another test signal from another channel (e.g., associated with another wavelength) within the optical fiber. DGD receiver 145 may process the other test signal, in a manner similar to that described above (e.g., with respect to blocks 610-620), by measuring a degree of polarization associated with the other test signal, determining a change in the degree of polarization (e.g., based on a maximum and minimum degree of polarization), and/or performing another look-up operation based on the change in the degree of polarization.

Based on the other look-up operation, DGD receiver device 145 may identify another value associated with a quantity of differential group delay associated with the other test signal. DGD receiver device 145 may determine an average value associated with the quantity of differential group delay based on the value associated with the quantity of differential group delay (e.g., associated with the test signal) and the other value associated with the quantity of differential group delay (e.g., associated with the other test signal). DGD receiver device 145 may, for example, determine that the average value, associated with the differential group delay (e.g., corresponding to the channel and the other channel), is greater than the threshold. Based on the determination that the average value is greater than the threshold, DGD receiver device 145 may present, for display (e.g., on a display device associated with DGD receiver device 145), a notification that indicates that the fiber, associated with working path 150, is not to be used to transport high capacity traffic. DGD receiver device 145 may generate another average value, associated with a quantity of differential group delay, for a quantity of channels that are specified by a network administrator associated with optical network 100. Additionally, or alternatively, DGD receiver device 145 may process test signals, in a manner similar to that described above (e.g., with respect to blocks 605-635), for other optical fibers within a fiber optic cable associated with working path 150.

Systems and/or methods, described herein, may enable a quantity of polarization mode dispersion, associated with an optical test signal traversing an optical fiber that is carrying traffic, to be used to determine whether the optical fiber can be used to transport high capacity traffic (e.g., associated with a data rate that is greater than a threshold).

The foregoing description provides illustration and description, but is not intended to be exhaustive or to limit the invention to the precise form disclosed. Modifications and variations are possible in light of the above teachings or may be acquired from practice of the invention.

For example, while series of blocks have been described with regard to FIG. 6, the order of the blocks may be changed in other implementations. Also, non-dependent blocks may be performed in parallel.

Furthermore, while the embodiments disclosed have been presented as generally suitable for use in an optical network, the systems and methods disclosed herein are suitable for any fiber optic network, fiber network, fiber line, or link that includes one or more transmission spans, amplifier spans or hops.

Even though particular combinations of features are recited in the claims and/or disclosed in the specification, these combinations are not intended to limit the disclosure of the invention. In fact, many of these features may be combined in ways not specifically recited in the claims and/or disclosed in the specification. Although each dependent claim listed below may directly depend on only one other claim, the disclosure of the invention includes each dependent claim in combination with every other claim in the claim set.

It will be apparent that embodiments, as described herein, may be implemented in many different forms of software, firmware, and hardware in the embodiments illustrated in the figures. The actual software code or specialized control hardware used to implement embodiments described herein is not limiting of the embodiments. Thus, the operation and behavior of the embodiments were described without reference to the specific software code—it being understood that software and control hardware may be designed to implement the embodiments based on the description herein.

No element, act, or instruction used in the present application should be construed as critical or essential to the invention unless explicitly described as such. Also, as used herein, the article "a" is intended to include one or more items. Where only one item is intended, the term "one" or similar language is used. Further, the phrase "based on" is intended to mean "based, at least in part, on" unless explicitly stated otherwise.

What is claimed is:

1. A system comprising:
an optical transmitter device to:
generate an optical test signal that includes a scrambled polarization state, and
output the test signal via an optical fiber associated with a network path that is transporting traffic associated with an optical network; and
an optical receiver device to:
receive the test signal from the optical transmitter device via the optical fiber,
measure one or more polarization states associated with the test signal,
determine, based on the one or more polarization states, a degree of polarization associated with the test signal,
identify a quantity of differential group delay associated with the test signal based on the degree of polarization,
output a notification that the optical fiber is available to carry high capacity traffic when the quantity of differential group delay is less than a threshold, where the high capacity traffic includes a data rate that is greater than a data rate threshold, and
output a notification that the optical fiber is not available to carry the high capacity traffic when the quantity of differential group delay is not less than the threshold.

2. The system of claim 1, where the optical transmitter device is further to:
generate another optical test signal that includes the scrambled polarization state, and output the other test signal, using a channel, associated with the optical fiber, that is different than another channel used to output the test signal, where the channel and the other channel are associated with different wavelengths.

3. The system of claim 2, where the optical receiver device is further to:
receive, from the channel associated with the optical fiber, the other test signal,
identify another quantity of differential group delay associated with the other test signal based on a degree of polarization identified as a result of a measurement of one or more other polarization states associated with the other test signal, and
determine an average quantity of differential group delay based on the quantity of group delay associated with the optical signal and the other quantity of group delay associated with the other optical signal.

4. The system of claim 3, where the optical receiver device is further to:
send another notification that the optical fiber is available to carry high capacity traffic when the average quantity of differential group delay is less than a threshold, and
send another notification that the optical fiber is not available to carry the high capacity traffic when the average quantity of differential group delay is not less than the threshold.

5. The system of claim 1, where, when generating the optical test signal, the optical transmitter device is to:
generate an optical signal,
modulate the optical signal in a manner that includes a frequency that corresponds to a channel associated with the optical fiber, and
process the modulated optical signal to create the optical test signal, where the processing causes a polarization state, associated with the modulated optical signal, to change as a function of time.

6. The system of claim 1, where, when identifying the quantity of differential group delay, the optical receiver device is to:
identify, within a data structure that is stored within a memory associated with the optical receiver device, another degree of polarization, of a plurality of degrees of polarization stored in the data structure, that matches the degree of polarization associated with the test signal, and
retrieve, from the data structure, the quantity of differential group delay that corresponds to the other degree of polarization within the data structure.

7. The system of claim 1, where, when determining the degree of polarization associated with the test signal, the optical receiver device is to:
identify, from the measurement of the one or more polarization states, a maximum degree of polarization and a minimum degree of polarization within a period of time during which the measurement is performed, and
determine the degree of polarization based on a difference between the maximum degree of polarization and the minimum degree of polarization during the period of time.

8. The system of claim 1, where, when measuring the one or more polarization states associated with the test signal, the optical receiver device is to:
detect, at a particular point in time, a principal state of polarization associated with the test signal and another principal state of polarization associated with the test signal, where the principal state of polarization and the other principal state of polarization are orthogonal,
identify a relative phase shift between the principal state of polarization and the other principal state of polarization, and
identify an instantaneous degree of polarization associated with the test signal, at the particular point in time, based on the relative phase shift between the principal state of polarization and the other principal state of polarization.

9. The system of claim 1, where the optical transmitter device is further to:
determine that a channel, of a plurality of channels associated with the optical fiber, does not carry the network traffic, and
output the test signal over the optical fiber and via the channel based on the determination that the channel does not carry the network traffic.

10. A method performed by an optical receiver interconnected to an optical transmitter by an optical fiber that carries traffic within an optical network, the method comprising:
receiving, by the optical receiver and from the optical transmitter via the optical fiber, one or more a test signals, where the one or more test signals are generated, by the optical transmitter, with a polarization state that changes as a function of time;
determining, by the optical receiver, a degree of polarization associated with each of the one or more test signals based on a measurement of a polarization associated with the each of the one or more test signals;
identifying, by the optical receiver, a differential group delay associated with the one or more test signals based on an average of the degree of polarization associated with the each of the one or more test signals;
outputting, by the optical receiver, a notification that the optical fiber is available to carry high capacity traffic when the differential group delay associated with the one or more test signals is less than a threshold, where the high capacity traffic includes a data rate that is greater than a data rate threshold; and
outputting, by the optical receiver, a notification that the optical fiber is not available to carry high capacity traffic when the differential group delay associated with the one or more test signals is not less than the threshold.

11. The method of claim 10, where the each of the one or more test signals is generated, by the optical transmitter, at a respective different frequency; and
where the each of the one or more test signals is received, from the optical fiber and via a respective different channel, based on the respective different frequency at which the each of the one or more test signals was generated.

12. The method of claim 10, where identifying the differential group delay associated with the one or more test signals includes:
identifying, within a memory associated with the optical receiver, a particular degree of polarization that matches the average of the degree of polarization associated with the each of the one or more test signals; and
retrieving, from the memory, the differential group delay, associated with the one or more test signals, that corresponds to the particular degree of polarization identified within the memory.

13. The method of claim 10, where determining the degree of polarization associated with the each of the one or more test signals, further includes:
measuring a principal state of polarization associated with the each of the one or more test signals;

measuring another principal state of polarization associated with the each of the one or more test signals, where the other principal state of polarization is orthogonal to the principal state of polarization; and identifying the degree of polarization associated with the each of the one or more test signals based on the principal state of polarization associated with the each of the one or more test signals and the other principal state of polarization associated with the each of the one or more test signals.

14. The method of claim 13, further comprising:
determining, for a particular test signal of the one or more test signals, that a first power level, associated with the principal state of polarization, matches a second power level associated with the other principal state of polarization; and
identifying that a power shift, associated with the particular test signal, does not exist based on the determination that first power level matches the second power level.

15. The method of claim 14, further comprising:
determining, for the particular test signal, that a first phase, associated with the principal state of polarization, matches a second phase associated with the other principal state of polarization;
identifying that a phase shift does not exist within the particular test signal based on the determination that first phase matches the second phase; and
determining that there is no differential group delay associated with the particular test signal based on the identification that the power shift does not exist and the phase shift does not exist.

16. The method of claim 10, where determining the degree of polarization associated with each of the one or more test signals further includes:
identifying, for one of the one or more test signals, a maximum degree of polarization and a minimum degree of polarization based on the measurement of the polarization; and
computing the degree of polarization, for the one of the one or more test signals, by subtracting the minimum degree of polarization from the maximum degree of polarization.

17. An optical receiver device comprising:
a measuring unit to:
receive an optical test signal from an optical fiber that carries traffic associated with an optical network, where the optical test signal was generated in a manner that includes a scrambled polarization state,
measure the test signal, over a period of time, to obtain information regarding a degree of polarization associated with the test signal, and
output the information regarding the degree of polarization associated with the test signal;
a processing unit to:
receive, from the measuring unit, the information regarding the degree of polarization associated with the test signal,
determine a change in degree of polarization associated with the test signal based on the information regarding the degree of polarization associated with the test signal, and
output the change in degree of polarization associated with the test signal; and
an estimating unit to:
receive, from the processing unit, the change in degree of polarization associated with the test signal,
estimate a quantity of differential group delay, associated with the test signal, based on the change in degree of polarization associated with the test signal and a look-up operation to identify, within a data structure, the quantity of differential group delay that corresponds to the change in degree of polarization,
send a notification that the optical fiber is available to carry high capacity traffic when the quantity of differential group delay is less than a threshold, where the high capacity traffic includes a data rate that is greater than a data rate threshold, and
send a notification that the optical fiber is not available to carry the high capacity traffic when the quantity of differential group delay is not less than the threshold.

18. The optical receiver device of claim 17, where, when determining the change in degree of polarization associated with the test signal, the processing unit is further to:
identify a first degree of polarization, of a plurality of degrees of polarization associated with the information regarding the degree of polarization, that is greater than each of the other degrees of polarization of the plurality of degrees of polarization,
identify a second degree of polarization, of the plurality of degrees of polarization, that is less than each of the other degrees of polarization of the plurality of degrees of polarization, and
compute the change in degree of polarization based on a difference between the first degree of polarization and the second degree of polarization.

19. The optical receiver device of claim 17, where, when estimating the quantity of differential group delay, associated with the test signal, the estimating unit is to:
identify, within the data structure, a degree of polarization, of a plurality of degrees of polarization stored in the data structure, that matches the degree of polarization associated with the test signal, and
retrieve, from the data structure, the quantity of differential group delay that corresponds to the identified degree of polarization, of the plurality of degrees of polarization, within the data structure.

20. The optical receiver device of claim 17, where, when measuring the test signal to obtain the information regarding the degree of polarization the measuring unit is to:
measure, at a particular point in time within the period of time, a first state of polarization associated with the test signal and a second state of polarization associated with the test signal, where the first state of polarization is orthogonal to the second state of polarization, and
identify an instantaneous degree of polarization associated with the test signal based on the first state of polarization and the second state of polarization that the particular point in time.

21. The optical receiver device of claim 20, where, when identifying the instantaneous degree of polarization associated with the test signal, the measuring unit is to:
measure a first power level associated with the first state of polarization and a second power level associated with the second state of polarization,
identify a power shift between the first state of polarization and the second state of polarization when the first power level does not match the second power level, and
determine a degree of polarization, associated with the test signal, based on the power shift between the first state of polarization and the second state of polarization.

22. The optical receiver device of claim 20, where, when identifying the instantaneous degree of polarization associated with the test signal, the measuring unit is to:

determine a degree of polarization, associated with the test signal, based on a difference in phase associated with the first state of polarization and the second state of polarization and a difference in power level between the first state of polarization and the second state of polarization.

23. The optical receiver device of claim 17, where the measuring unit is further to:

measure a portion of channels, of a plurality of channels within the optical fiber, that are not transporting the traffic to obtain information regarding a degree of polarization associated each of the portion of the channels;

where the processing unit is further to:

determine a change in degree of polarization associated with the each of the portion of the channels based on the information regarding the degree of polarization associated with the each of the portion of the channels; and where the estimating unit is further to:

determine an average change in degree of polarization based on the change in degree of polarization associated with the each of the channels, and estimate another quantity of differential group delay, associated with the test signal, based on the average change in degree of polarization associated with the each of the portion of the channels.

* * * * *